UNITED STATES PATENT OFFICE.

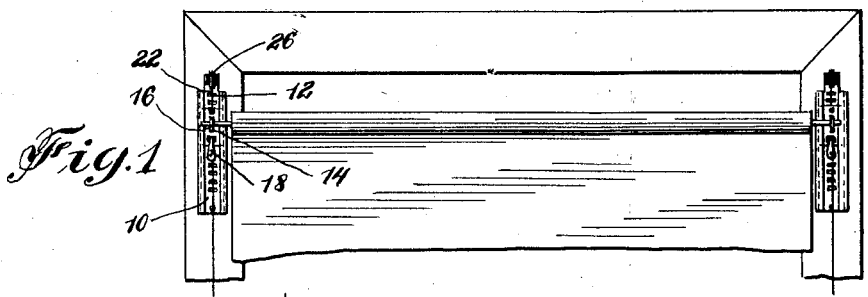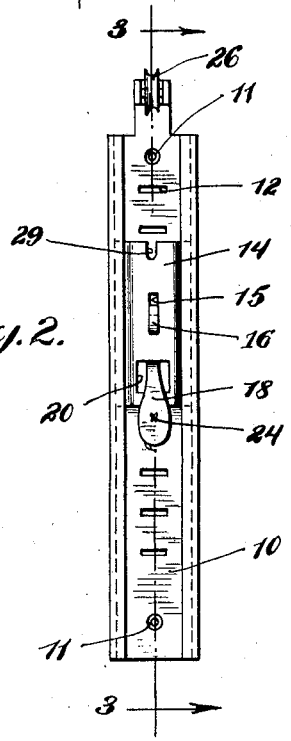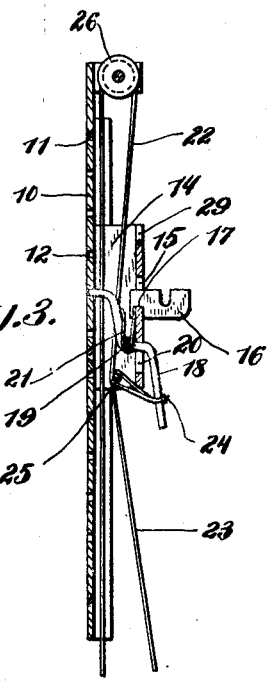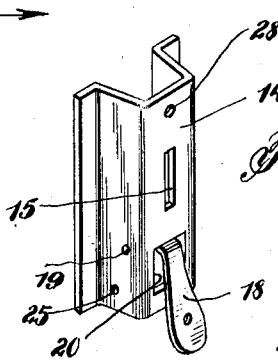

MARTIN WARNER AND CHARLES WHETSTONE, OF AKRON, OHIO.

WINDOW-SHADE ATTACHMENT.

1,343,859. Specification of Letters Patent. Patented June 15, 1920.

Application filed March 9, 1920. Serial No. 364,600.

*To all whom it may concern:*

Be it known that we, MARTIN WARNER and CHARLES WHETSTONE, citizens of the United States, residing at Akron, in the county of Summit and State of Ohio, respectively, have invented new and useful Improvements in Window-Shade Attachments, of which the following is a specification.

This invention relates to window shade brackets, and aims to provide a construction and an arrangement of parts wherein the bracket together with the shade roller may be moved up and down with respect to the window frame, thus permitting ventilation at the top of the window and also permitting light to come in at the top of the window when it is desired.

Another object of the invention resides in the construction of a bracket for the purpose mentioned wherein the bracket may be used, either upon the jamb of the window or on the face of the frame.

In carrying out the invention, we provide means for locking the window shade bracket in any adjusted position, in combination with means whereby the locking means can be controlled from a remote point from the bracket.

A further object of the invention resides in the provision of a bracket, which when in place upon the window possesses an artistic appearance, the bracket being simple in construction, so that it may be manufactured and sold at a nominal cost.

The nature and advantages of the invention will be better understood when the following detail description is taken in connection with the accompanying drawing, the invention residing in the construction, combination and arrangement of parts as claimed.

In the drawings forming part of this specification, like numerals of reference indicate similar parts in the several views and wherein:

Figure 1 is a view in elevation showing the device as applied to a window.

Fig. 2 is an enlarged view in elevation of one of the shade brackets and its support.

Fig. 3 is a longitudinal sectional view taken on the line 3—3 of Fig. 2 looking in the direction of the arrow.

Fig. 4 is a perspective view of the bracket.

Referring to the drawing in detail, 10 indicates a support for the bracket illustrated in Fig. 2, and as shown in Fig. 1 there is one of these supported and arranged at each side of the window frame. The opposite longitudinal edges of the support 10 are formed to provide grooves or channels in which the bracket slides. The support is provided with openings 11 for the reception of fastening elements utilized in securing the support to the window casing. The support 10 is notched as at 12, throughout the major portion of its length for a purpose to be hereinafter described.

The bracket indicated in Fig. 4 is of substantially U-shape formation in cross section, one of these brackets being arranged to slide in the grooves of each support 10. Each bracket indicated at 14 is provided with an elongated slot 15, to receive the bearing 16 for the pintles of the shade roller. These bearings are of usual construction, except that they are provided with a U-shaped notch 17 to receive the lower edge of the slot 15 in which manner the bearings are held associated with the brackets. As above stated, the brackets are adapted to slide upon the support 10, and in order to hold the brackets fixed relatively upon their support in any given position, we utilize a locking lever 18 of substantially V-shaped formation. The lever is pivoted within the bracket as at 19, although one end of the lever projects through an opening 20 in the bracket terminating beneath the lower edge thereof as clearly shown in Figs. 3 and 4. The opposite terminal of the lever is curved to engage the notches 12 to hold the bracket fixed upon the support, this terminal being normally held within the notches through the instrumentality of a spring 21.

To facilitate adjustment of the shade roller and its supporting bracket for the purpose hereinabove stated, we make use of two cables indicated at 22 and 23 respectively. The cable 22 has one terminal secured to the lower extremity of the lever as indicated at 24, the cable passing beneath the guide pin 25 arranged within the bracket, and then trained over a pulley 26 journaled upon the upper end of the support 10. This cable is then extended downwardly into convenient reach of the operator, so that when a pull is exerted upon the cable 22, the lever 18 is moved upon its pivot and disengaged from the support 10, allowing the bracket and shade roller to be elevated.

When it is desired to lower the bracket and shade roller for ventilation at the top of the window, or to permit light to come in at the top of the window over the shade, the cable 23 is pulled to disengage the locking lever from the support 10. The cable 23 as shown is also connected with the adjacent terminal of the lever 18, and is trained over the guide pin 25 terminating within convenient reach of the operator. When the cable 23 is pulled upon, the rocking element 18 is not only disengaged from the support 10, but the bracket and roller is lowered with the said operation. The supports 10 may be secured upon the face of the window casing as illustrated in Fig. 1, or they may be arranged against the jamb of the window. When used in the manner illustrated in Fig. 1, the shade roller is journaled in the bearings 16, but when the supports 10 are secured to the jamb of the window, the shade roller is journaled directly upon the brackets 14. For this purpose, one of the brackets is provided with an opening 28, while the bracket at the opposite side of the window is provided with a notch 29. When the component parts of the invention are associated, and arranged in position for use, they afford an artistic appearance to the window while the parts are arranged to permit the shade roller to be readily and easily adjusted for the purpose stated.

While it is believed that from the foregoing description, the nature and advantages of the invention will be readily apparent, we desire to have it understood that what is herein shown is merely illustrative, that we do not limit ourselves to the construction described, and that such changes may be resorted to when desired as fall within the scope of what is claimed.

What we claim as new is:—

1. A shade roll holder comprising stationary slides mounted upon the window casing, shade brackets adjustable on said slides, said slides having spaced notches, a pivoted latch element carried by the bracket, and resilient means for normally holding the element engaged with said notches.

2. A shade roll holder comprising stationary slides mounted upon the window frame, shade brackets adjustable on said slides, means for holding said brackets in adjusted position, said means including a latch element pivoted upon each bracket, and flexible elements terminally secured to each latch and arranged to release the latch and adjust the brackets in the manner stated.

3. A shade roll holder comprising stationary slides mounted upon the window frame, brackets adjustable on said slide, a spring pressed pivoted latch element carried by said bracket to engage its support to hold the bracket in adjusted position, a guide pin carried by the bracket, flexible elements terminally secured to said latch and trained over said guide pin, a pulley journaled at the top of each slide, one of said cables being trained over said pulley and adapted to effect the release of the latch element and elevate the bracket, the other of said flexible elements being adapted to effect the release of said elements and lower said bracket.

In testimony whereof we affix our signatures.

MARTIN WARNER.
CHAS. WHETSTONE.